US010322650B2

United States Patent
Furukawa et al.

(10) Patent No.: US 10,322,650 B2
(45) Date of Patent: Jun. 18, 2019

(54) SEAT SLIDING DEVICE

(71) Applicant: TOYOTA BOSHOKU KABUSHIKI KAISHA, Aichi (JP)

(72) Inventors: Kenji Furukawa, Aichi (JP); Keigo Matsumoto, Aichi (JP); Yoshiro Hara, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 15/808,219

(22) Filed: Nov. 9, 2017

(65) Prior Publication Data

US 2018/0147956 A1      May 31, 2018

(30) Foreign Application Priority Data

Nov. 29, 2016   (JP) .................................. 2016-231324

(51) Int. Cl.
*B60N 2/07*      (2006.01)
(52) U.S. Cl.
CPC .......... *B60N 2/0725* (2013.01); *B60N 2/071* (2013.01); *B60N 2/073* (2013.01); *B60N 2/0705* (2013.01); *B60N 2/0732* (2013.01)
(58) Field of Classification Search
CPC ..... B60N 2/0725; B60N 2/071; B60N 2/0732
See application file for complete search history.

(56) References Cited

U.S. PATENT DOCUMENTS

| 5,242,143 | A | * | 9/1993 | Nagashima | .......... | B60N 2/0705 |
| | | | | | | 248/188.9 |
| 8,382,057 | B2 | * | 2/2013 | Napau | .................. | B60N 2/0705 |
| | | | | | | 248/423 |
| 2007/0170743 | A1 | * | 7/2007 | Kinoshita | ............ | B60N 2/0705 |
| | | | | | | 296/65.13 |
| 2011/0240820 | A1 | * | 10/2011 | Napau | .................. | B60N 2/0705 |
| | | | | | | 248/429 |

FOREIGN PATENT DOCUMENTS

JP          2012-232628        11/2012

* cited by examiner

*Primary Examiner* — Anita M King
(74) *Attorney, Agent, or Firm* — Greenblum & Bernstein, P.L.C.

(57) ABSTRACT

A movable rail is slidable relative to a fixed rail and supports a seat. A projection protrudes towards the seat from an upper surface of the movable rail that faces the seat and fixes the seat to the movable rail. A rail cover is elastic, and configured to cover the upper surface of the movable rail. The rail cover extends in a direction parallel to a longitudinal axis of the fixed rail and comprises a slit that allows the projection to pass through. A spacer plate having a strip shape is attached to the upper surface of the movable rail and extends in a direction parallel to a longitudinal axis of the movable rail, and is configured to comprise a through-hole for the projection to pass through.

11 Claims, 10 Drawing Sheets

SEAT SLIDING DEVICE

CROSS-REFERENCE TO RELATED APPLICATIONS

This application claims the benefit of Japanese Patent Application No. 2016-231324 filed Nov. 29, 2016 in the Japan Patent Office, the entire disclosure of which is incorporated herein by reference.

BACKGROUND

The present disclosure relates to a seat sliding device that supports a seat so that the seat is slidable.

As disclosed in Japanese Unexamined Patent Application Publication No. 2012-232628 (Patent Document 1), a seat sliding device comprises, for example, a fixed rail and a movable rail that is slidable relative to the fixed rail. On the upper surface of the movable rail, bolts are disposed to fix a seat to the movable rail.

SUMMARY

When the length of the fixed rail along its longitudinal axis (hereinafter referred to as a rail length) is large and the sliding range of the movable rail is large, the rail length becomes greater than the front-to-rear length of a seat cushion. This causes the movable rail and the fixed rail to be exposed.

It is preferable that one aspect of the present disclosure is a seat sliding device that can reduce exposure of the movable rail and the fixed rail.

One aspect of the present disclosure is a seat sliding device that supports a seat so that the seat is slidable. The seat sliding device comprises a fixed rail; a movable rail; a projection; a rail cover; and a spacer plate. The movable rail is slidable relative to the fixed rail and supports the seat. The projection protrudes towards the seat from an upper surface of the movable rail that faces the seat and fixes the seat to the movable rail. The rail cover is elastic and configured to cover the upper surface of the movable rail, extends in a direction parallel to a longitudinal axis of the fixed rail, and comprises a slit that allows the projection to pass through. The spacer plate has a strip shape and is attached to the upper surface of the movable rail, extends in a direction parallel to a longitudinal axis of the movable rail, and comprises a through-hole for the projection to pass through.

In the present disclosure, the aforementioned configuration can provide a gap sized to correspond to the thickness of the spacer plate between the movable rail and the seat. The rail cover can be disposed in this gap. Since the rail cover can cover the movable rail and the fixed rail, exposure of the movable rail and the fixed rail can be reduced.

If the gap between the movable rail and the seat is provided by using, for example, a spacer that is welded to the upper surface of the movable rail, an additional process for the welding will be required, and thus the number of manufacturing processes for the movable rail will be increased.

In contrast, since the spacer plate according to the present disclosure comprises a through-hole that allows the projection to pass through, the spacer plate is temporarily fixed with the projection being disposed through the through-hole. Thus, if the movable rail and the seat are fixed to each other without welding the spacer plate to the movable rail, the spacer plate is interposed and fixed between the movable rail and the seat. In other words, the welding process of the spacer plate is not required. This can prevent an increase in the number of manufacturing processes for the movable rail.

In the present disclosure, the spacer plate may comprise a spacer ring that has a ring shape and configures a peripheral part of the through-hole, and a plate that has a strip shape and holds the spacer ring. The seat sliding device having such a configuration can support the weight of the seat and a load imposed on the seat with the spacer ring.

In the present disclosure, the spacer ring and the plate may each be made of a different material. The material for the spacer ring may have a higher compressive strength than the material for the plate. The seat sliding device having such a configuration can confidently support the weight of the seat and a load imposed on the seat with the spacer ring.

In the present disclosure, the spacer ring may be made of metal, and the plate may be made of resin. The seat sliding device having this configuration can prevent an increase in manufacturing cost of the spacer plate while still providing strength of the spacer ring, which is required to have a compressive strength.

In the present disclosure, a width measurement may be one of outer dimensions of an area of the spacer plate measured along a line that is parallel to a seat-width axis. A first width may be a first width measurement of an area of the spacer plate where the through-hole is situated; and a second width is a second width measurement of an area of the spacer plate where the through-hole is not situated. The first width and the second width may be substantially equal to each other.

In the seat sliding device having such a configuration, outer edges of the slit have a substantially straight-line shape along the longitudinal axis of the fixed rail. Thus, aging of the slit such as a large partial flexural deformation on its outer edges can be reduced.

Another aspect of the present disclosure is a spacer plate that is configured to be used in a seat sliding device that supports a seat so that the seat is slidable. The seat sliding device comprises a fixed rail; a movable rail; a projection; and a rail cover. The movable rail is slidable relative to the fixed rail and supports the seat. The projection protrudes towards the seat from an upper surface of the movable rail that faces the seat and fixes the seat to the movable rail. The rail cover is elastic and configured to cover the upper surface of the movable rail, extends in a direction parallel to a longitudinal axis of the fixed rail, and comprises a slit that allows the projection to pass through. The spacer plate comprises a plate body. The plate body that has a strip shape is attached to the upper surface of the movable rail, extends in a direction parallel to a longitudinal axis of the movable rail, and comprises a through-hole for the projection to pass through.

BRIEF DESCRIPTION OF THE DRAWINGS

Example embodiments of the present disclosure will be described hereinafter with reference to the accompanying drawings, in which.

DETAILED DESCRIPTION OF THE PREFERRED EMBODIMENTS

An "embodiment" explained hereinafter shows one example of embodiments that belong to the technical scope of the present disclosure. In other words, matters to specify the invention recited in the claims are not limited to specific configurations or structures that are shown in the embodiments explained hereinafter.

Arrows and other marks that indicate directions labelled on each drawing are made for easy understanding of relationship between each drawing. Arrows and other marks (directions) on each drawing do not limit the scope of the present disclosure.

At least in respect of a member or portion that is labeled with a reference numeral for explanations, there is at least one in number of such a member or portion unless the number is otherwise specified, for example, as "one of". In other words, there may be two or more of such a member or portion disposed.

(Embodiment)

Figure 1:
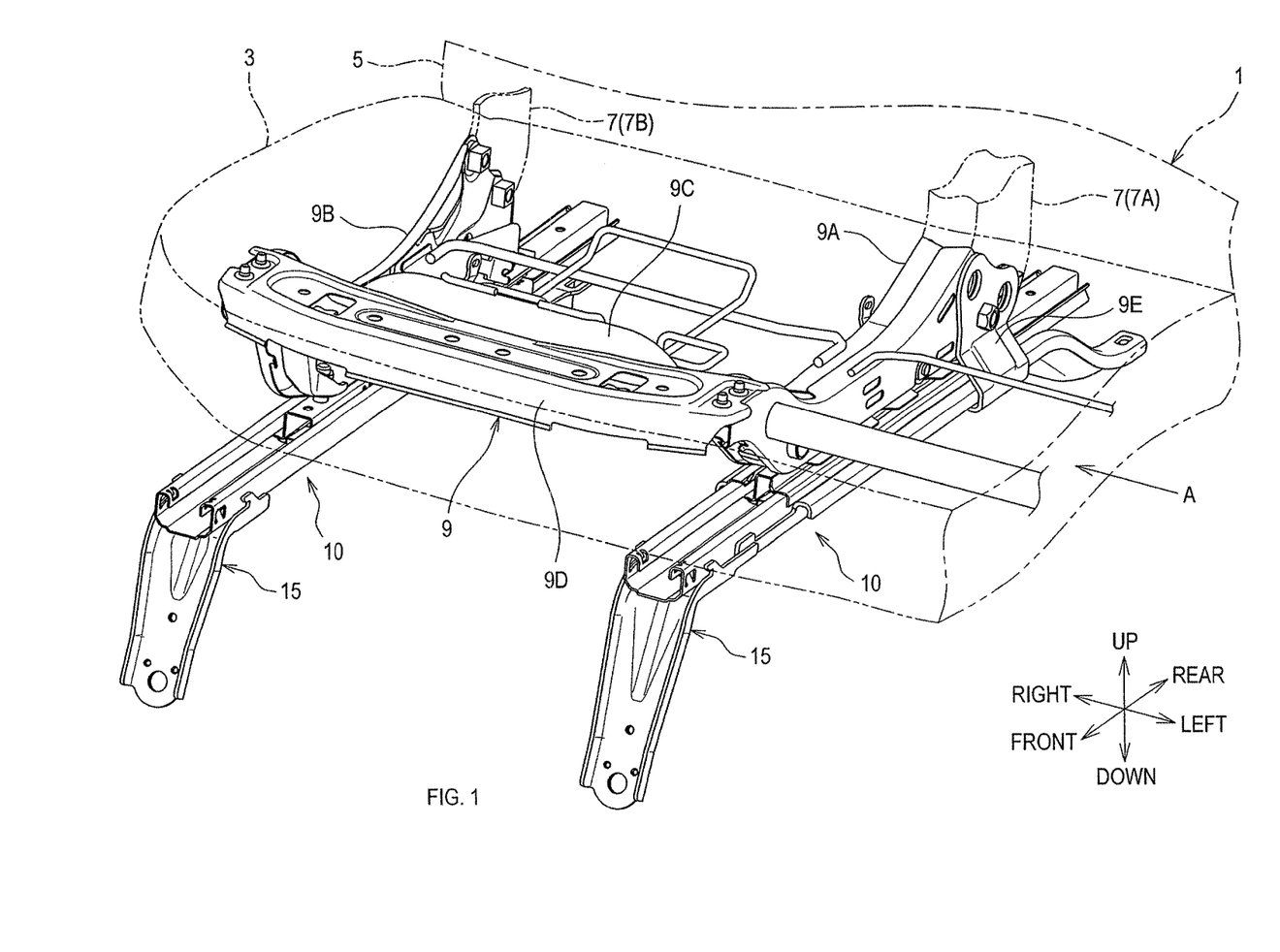
FIG. 1 is a perspective view showing a cushion frame according to an embodiment.

In the present embodiment, a vehicle seat configured as a rear seat (rear bench seat) for a passenger car and other vehicles will he explained. FIG. 1 shows a part of the vehicle seat (hereinafter also referred to as a side seat), which is situated in the first side (the right side in the present embodiment) of the vehicle seat along the width axis of the vehicle. In the explanations hereinafter, directions are defined in relation to a seat sliding device of the present embodiment that is assembled in a vehicle.

1. Overview of Vehicle Seat

As shown in FIG. 1, a vehicle seat 1 comprises at least a seat cushion 3, and a seatback 5. The seat cushion 3 supports the buttocks of a passenger. The seatback 5 supports the back of the passenger.

A back frame 7 is a frame structure of the seatback 5. The back frame 7 comprises two side frames 7A and 7B that are respectively disposed in the first width-end and the second width-end of the side seat along seat-width axis. The seat-width axis is consistent with the width axis of the vehicle (right-left axis) in the present embodiment.

A cushion frame 9 is a frame structure of the seat cushion 3. The cushion frame 9 comprises two side frames 9A and 9B; a front pipe 9C; and a front panel 9D.

The two side frames 9A and 9B are respectively disposed in the first and second width-ends of the side seat, and extend along the front-rear axis of the vehicle seat 1. The front pipe 9C and the front panel 9D are disposed in the front end of the seat cushion 3, and couple the two side frames 9A and 9B together.

Two seat sliding devices 10 according to the present embodiment are respectively disposed below the side frames 9A and 9B. The shape of the two seat sliding devices 10, on the right side and the left side of the side seat, are substantially mirror-image symmetric to each other and have the same configuration. Hereinafter, the configuration of the two seat sliding devices 10 according to the present embodiment will be explained by describing a first seat sliding device 10 below the side frame 9A as an example.

2. Structure of Seat Sliding Device

Figure 2:
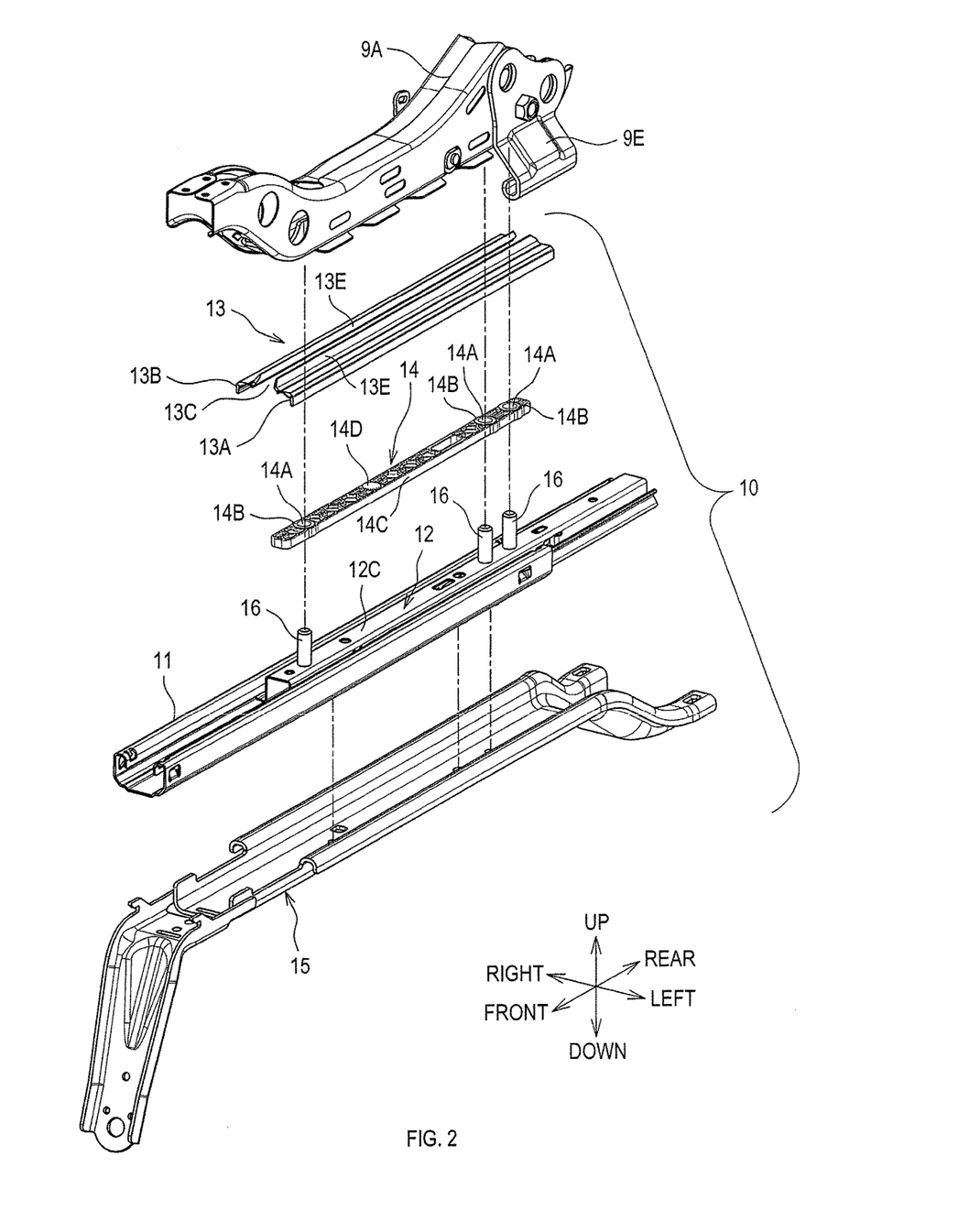
FIG. 2 is an exploded perspective view showing a seat sliding device according to the embodiment.

As shown in FIG. 2, the first seat sliding device 10 comprises at least a fixed rail 11; a movable rail 12; a rail cover 13; and a spacer plate 14. The fixed rail 11 is directly or indirectly fixed to a floor panel or other part of the vehicle such that the longitudinal axis of the fixed rail 11 is consistent with the longitudinal axis of the side frame 9A.

Figure 3:
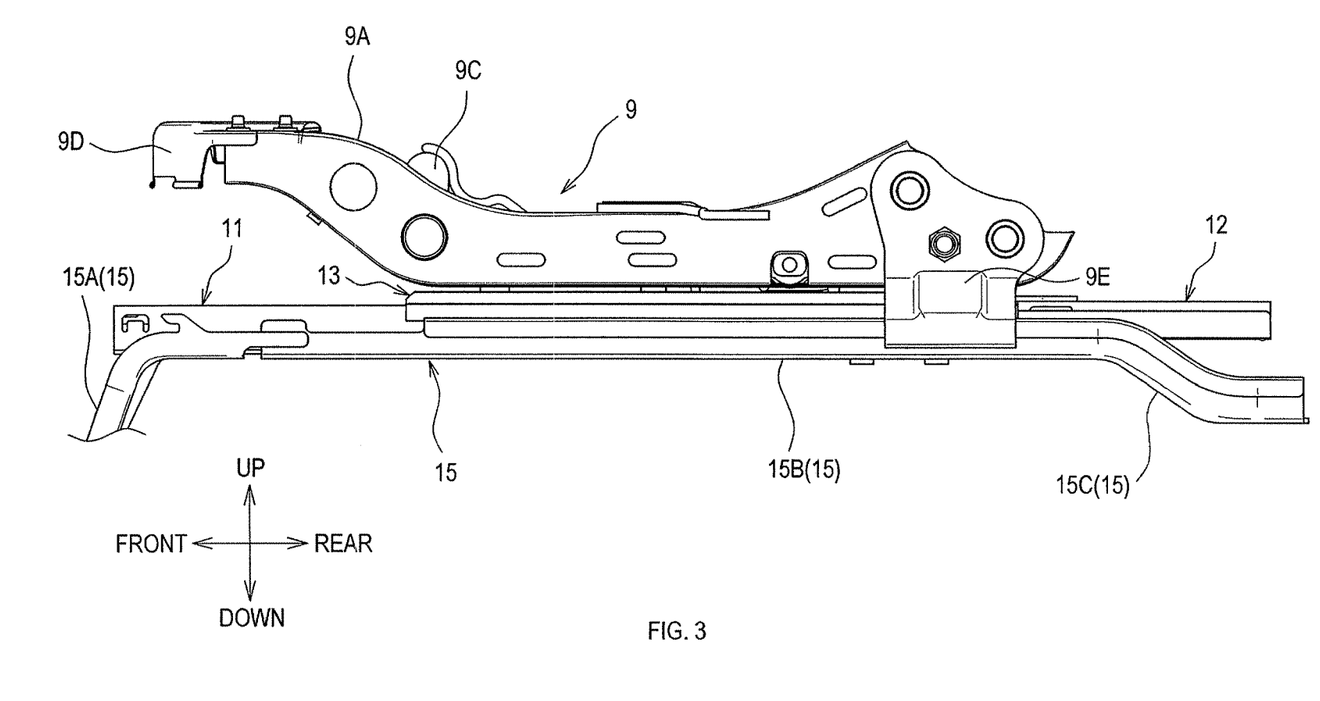
FIG. 3 shows a view on arrow A of FIG. 1.

The fixed rail 11 according to the present embodiment is fixed to the floor panel or other part of the vehicle via a bracket 15. As shown in FIG. 3, the bracket 15 comprises a first bracket member 15A; a second bracket member 15B; and a third bracket member 15C.

The first bracket member 15A fixes a first longitudinal-end of the fixed rail 11 (an end in the front side of the seat) to the vehicle. The third bracket member 15C fixes a second longitudinal-end of the fixed rail 11 (another end in the rear side of the seat) to the vehicle.

Figure 4:
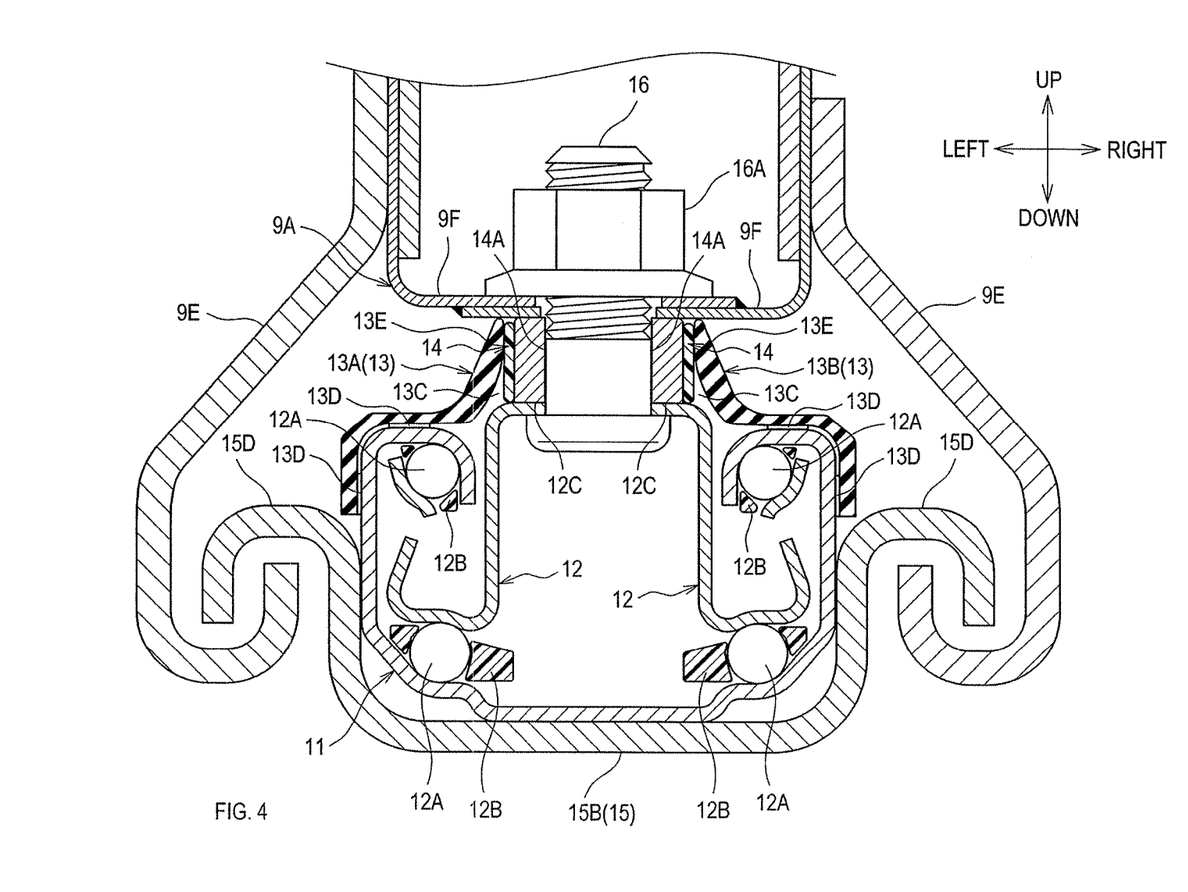
FIG. 4 is a sectional view of the seat sliding device according to the embodiment, taken along a line orthogonal to a longitudinal axis of the seat sliding device.

The second bracket member 15B extends parallel to the fixed rail 11 and is coupled to a bottom surface of the fixed rail 11, in other words, to a surface of the fixed rail 11 that faces the floor panel of the vehicle. As shown in FIG. 4, the second bracket member 15B comprises, in each of its two ends along the seat-width axis, a hook 15D having a substantially J-shaped curved sectional shape.

The hook 15D can be hooked to a hook bracket 9E that is disposed on the side frame 9A. The hook bracket 9E has a substantially J-shaped sectional shape that enables the hook bracket 9E to hook to the hook 15D. The hook bracket 9E is a member for supporting a load imposed on a seat belt (not shown).

As shown in FIG. 1, the hook bracket 9E according to the present embodiment is fixed to a rear end of the side frame 9A along the longitudinal axis of the side frame 9A (in the rear side of the seat cushion 3 in the present embodiment). The hook 15D is disposed at least along the range in which the hook bracket 9E can be displaced by sliding.

In the present embodiment, the second bracket member 15B and the third bracket member 15C are integrally formed into a single metallic part made by press working or other processes. The first bracket member 15A and the second bracket member 15B are fixed to the fixed rail 11 by welding or a fastening mechanism such as a screw.

The movable rail 12 is slidable relative to the fixed rail 11 along the longitudinal axis of the fixed rail 11. The side frame 9A, and thus the vehicle seat 1, are fixed to and supported by the movable rail 12 and are displaced by sliding integrally with the movable rail 12 along the front-rear axis of the vehicle seat 1.

As shown in FIG. 4, the movable rail 12 is supported by the fixed rail 11 via rolling elements 12A. Each rolling element 12A is a spherical rolling element, such as a steel ball, and is retained by a retainer 12B that is made of resin.

Figure 5:
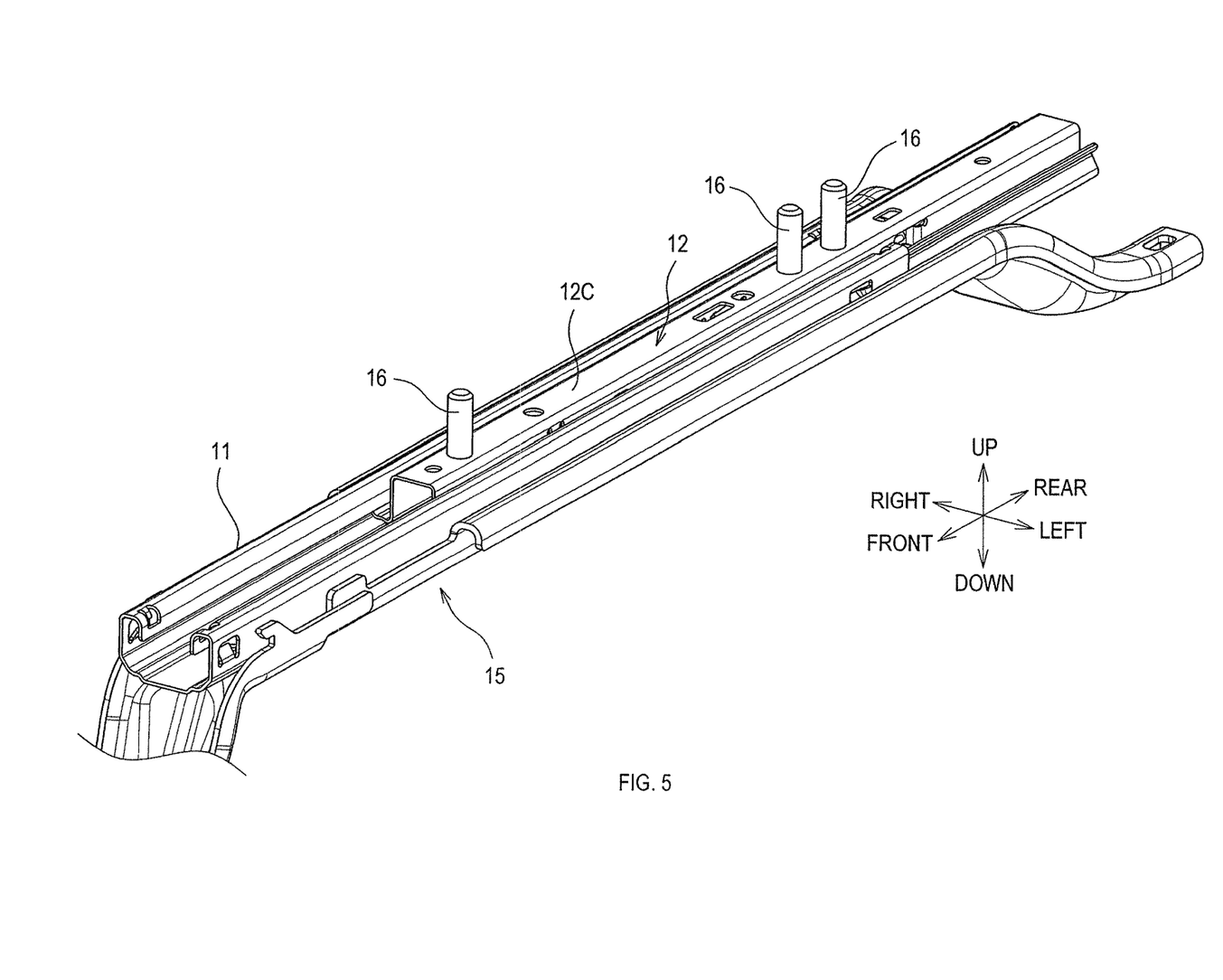
FIG. 5 is a perspective view showing the seat sliding device according to the embodiment.

Each rolling element 12A rolls to contact the fixed rail 11 and the movable rail 12, which causes the movable rail 12 to be slidable relative to the fixed rail 11. As shown in FIG. 5, at least one projection 16 (three projections 16, in the present embodiment) is disposed on an upper surface 12C of the movable rail 12.

The upper surface 12C of the movable rail 12 is a surface of the movable rail 12 that faces the vehicle seat 1, in other words, that faces the side frame 9A. Each projection 16 is a rod-like projection that protrudes from the upper surface 12C towards the vehicle seat 1 and serves to fix the vehicle seat 1 to the movable rail 12.

Figure 6:
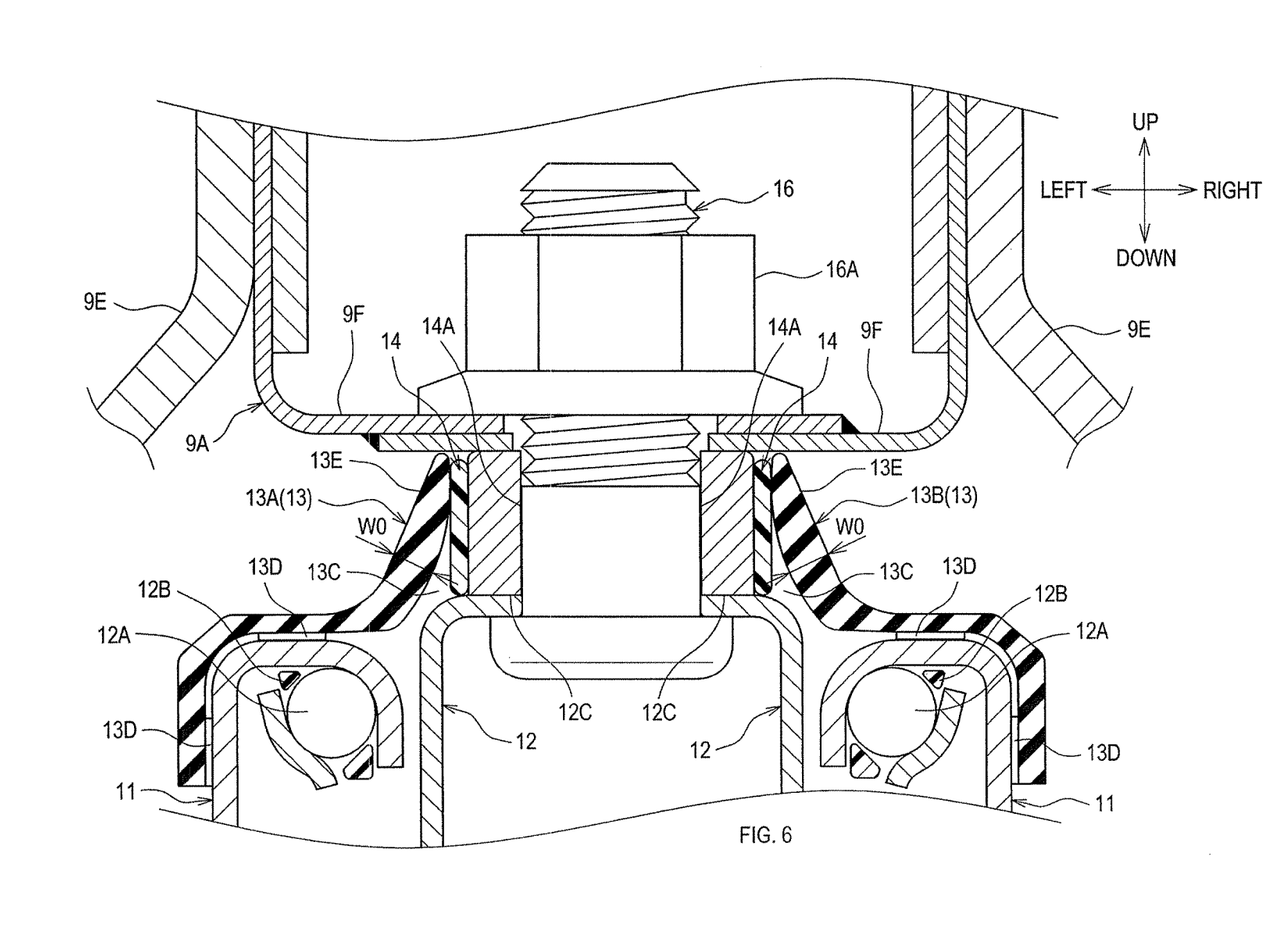
FIG. 6 is an enlarged view around slits of FIG. 4.

As shown in FIG. 6, each projection 16 according to the present embodiment is a bolt that is disposed upwardly through the upper surface 12C of the movable rail 12. Each projection 16 (hereinafter, also referred to as a fixing bolt 16) is disposed through the side frame 9A. A nut 16A is screwed down each fixing bolt 16 onto the side frame 9A.

The side frame 9A according to the present embodiment comprises two panels 9F, a right panel 9F and a left panel 9F. A vertical portion of the right panel 9F and a vertical portion of the left panel 9F are orthogonal to the seat-width axis and face each other across the seat-width axis. A lower horizontal part of the right panel 9F and a lower horizontal part of the left panel 9F overlap with each other. Each of the two panels 9F is formed into a given shape by press working. Each fixing bolt 16 is disposed through the side frame 9A in the area where the lower horizontal parts of the two panels 9F overlap with each other.

The rail cover 13 extends in a direction parallel to the longitudinal axis of the fixed rail 11 to cover at least the upper surface 12C of the movable rail 12. The rail cover 13 is made of an elastic material such as a rubber.

Since the rail cover 13 covers the upper surface 12C of the movable rail 12, at least a part of the fixed rail 11 that is occupied by the movable rail 12 is also covered by the rail cover 13. If the length of the rail cover 13 along its longitudinal axis is equal to or longer than the length of the fixed rail 11 along its longitudinal axis, the rail cover 13 can cover the movable rail 12 and the fixed rail 11.

Figure 7:
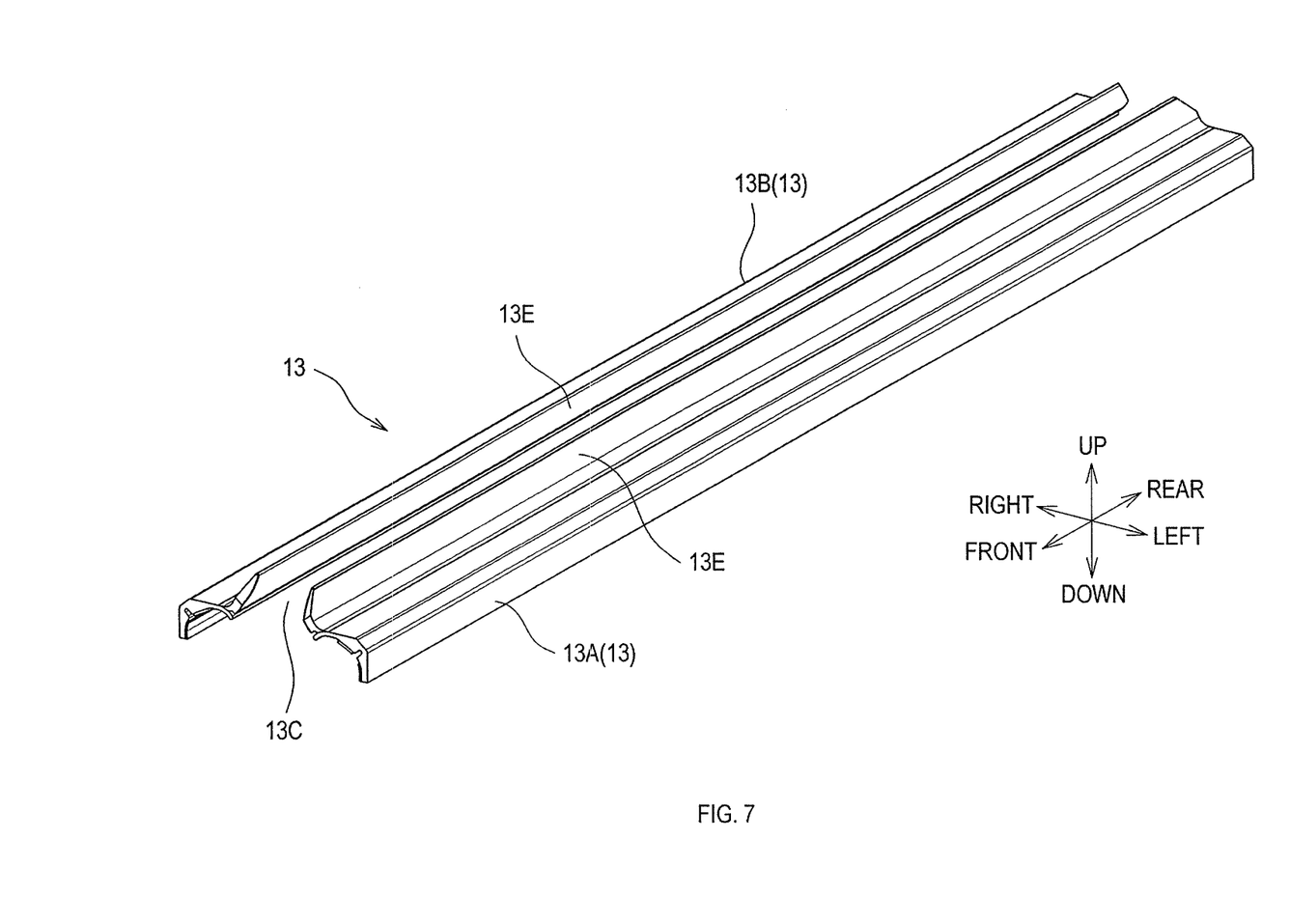
FIG. 7 is a perspective view showing a rail cover according to the embodiment.

As shown in FIG. 7, the rail cover 13 comprises a slit 13C that allows each fixing bolt 16 to pass through. The slit 13C is a continuous gap that extends in a direction parallel to the longitudinal axis of the fixed rail 11.

The rail cover 13 according to the present embodiment comprises a first cover member 13A and a second cover member 13B that are spaced apart from each other along the seat-width axis. The gap between the first cover member 13A and the second cover member 13B configures the slit 13C. As shown in FIG. 6, the first cover member 13A and the second cover member 13B are each fixed to the fixed rail 11 with an adhesive 13D, such as a double-face adhesive tape.

Figure 8:
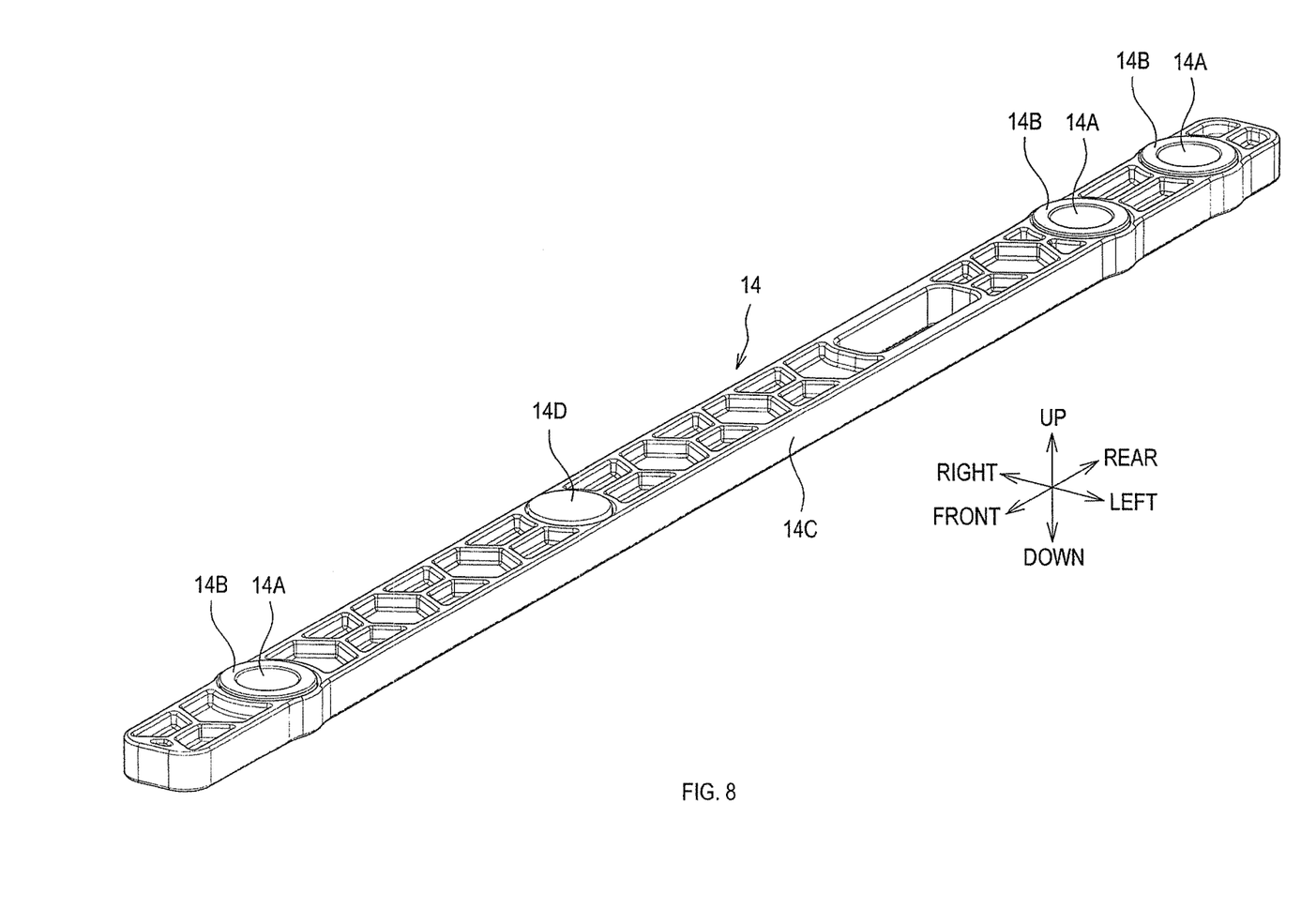
FIG. 8 is a perspective view showing a spacer plate according to the embodiment.

The spacer plate 14 is a plate member that has a strip shape. The spacer plate 14 extends in a direction parallel to the longitudinal axis of the movable rail 12, as shown in FIG. 2, and is attached to the upper surface 12C of the movable rail 12. As shown in FIG. 8, the spacer plate 14 comprises through-holes 14A that pass through the thickness of the spacer plate 14. Each through-hole 14A is provided for each fixing bolt 16 to pass through (see, FIG. 6).

More specifically, the spacer plate 14 comprises at least spacer rings 14B, and a plate 14C. Each spacer ring 14B has a ring shape and configures a peripheral part of each through-hole 14A.

The plate 14C is a plate body that has a strip shape and holds the spacer rings 14B. The plate 14C according to the present embodiment is a plate that has a strip shape and a honeycomb structure with a number of recesses (reliefs) for the purpose of weight reduction.

Figure 9:
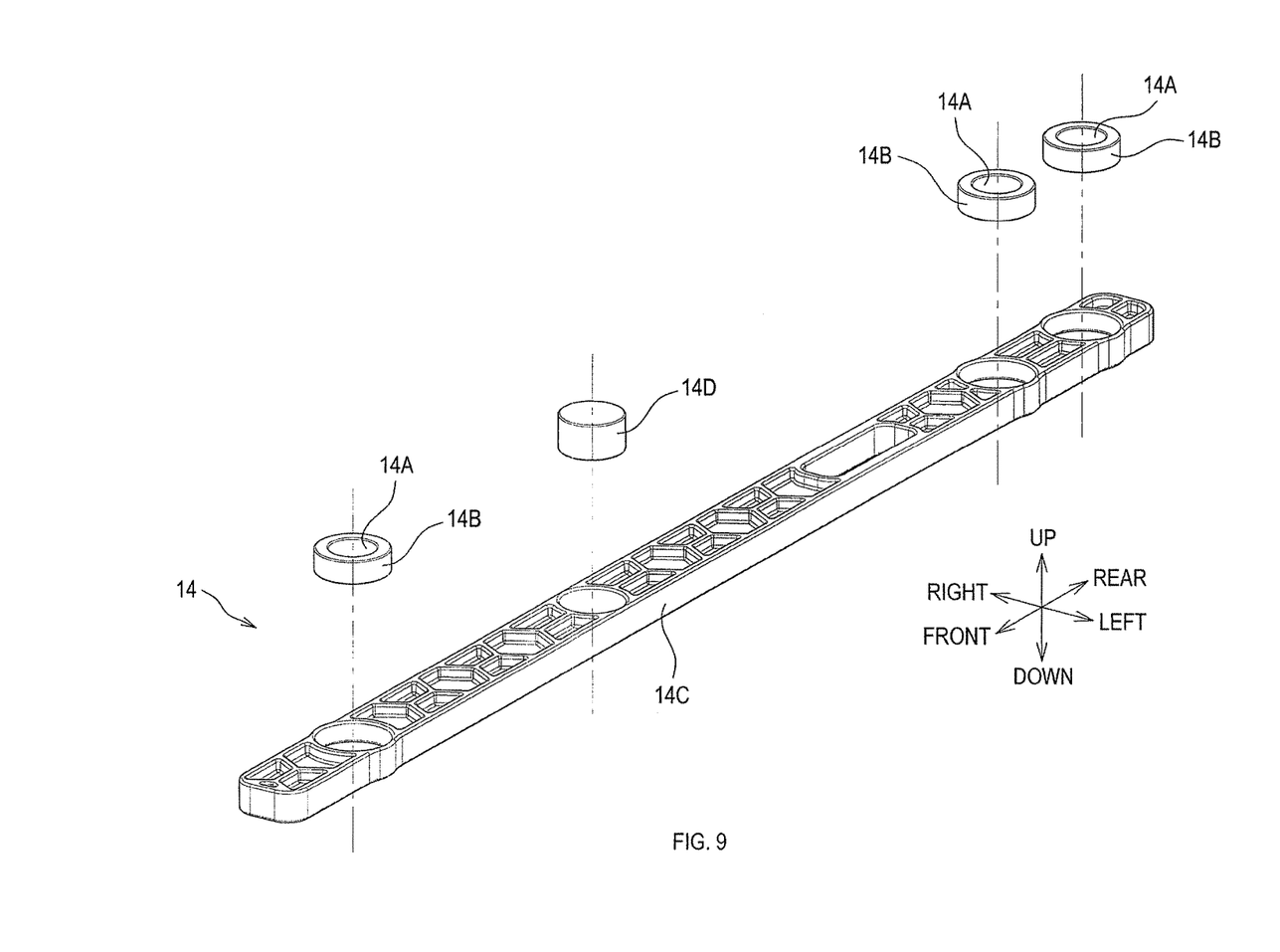
FIG. 9 is an exploded perspective view showing the spacer plate according to the embodiment.

As shown in FIG. 9, a member that forms each spacer ring 14B is different from a member that forms the plate 14C. A material for the spacer rings 14B have a higher compressive strength than a material for the plate 14C.

More specifically, each spacer ring 14B is preferably made of metal, and the plate 14C is preferably made of resin. Each spacer ring 14B is formed integrally with the resin-made plate 14C by insert molding. In the present embodiment, in an area of the spacer plate 14 that is subject to a relatively large load, a metallic spacer 14D is embedded in the plate 14C.

Figure 10:
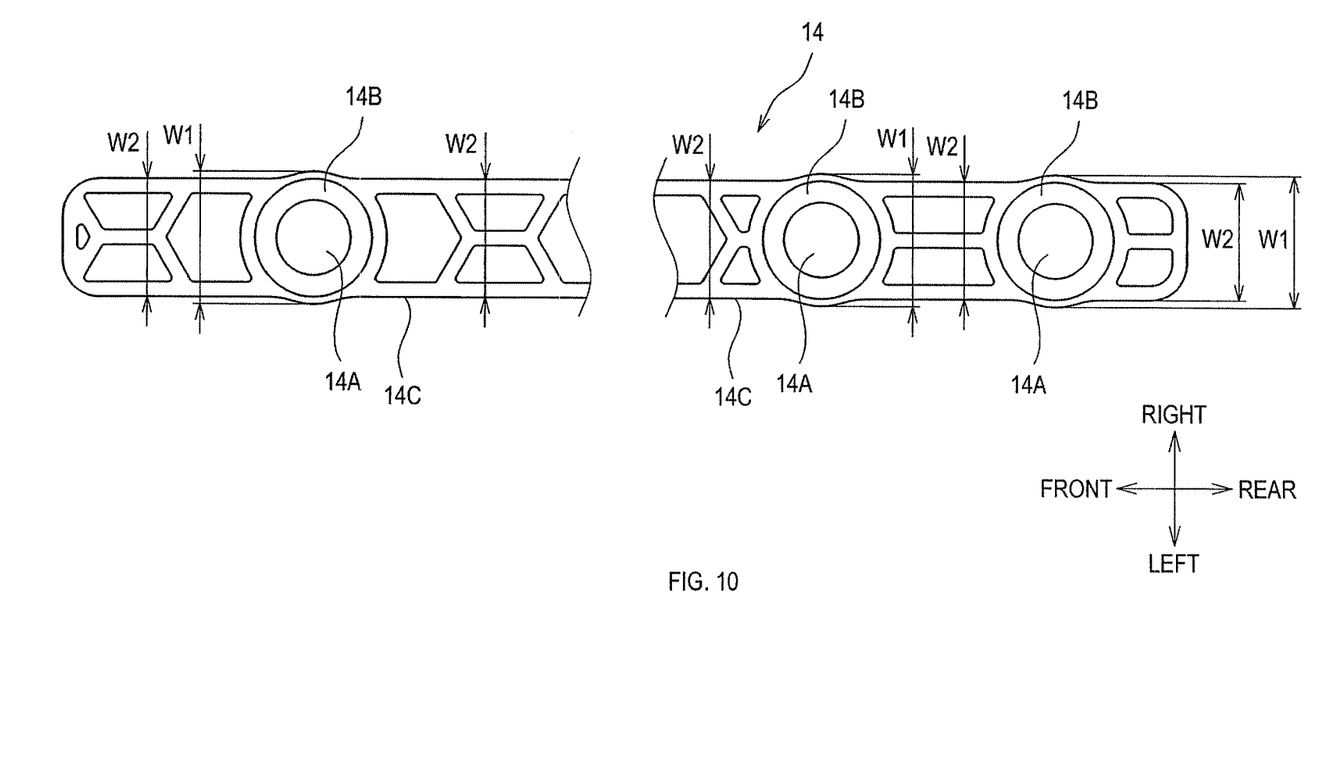
FIG. 10 is a top view showing the spacer plate according to the embodiment.

As shown in FIG. 10, the spacer plate 14 is configured so that a first width W1 and a second width W2 are substantially equal to each other. The first width W1 is a width measurement of an area of the spacer plate 14 where each through-hole 14A is situated.

The second width W2 is a width measurement of an area of the spacer plate 14 where the through-hole 14A is not situated. The width measurement is one of the outer dimensions of the spacer plate 14 for an area that is parallel to the seat-width axis.

The meaning of the expression "the first width W1 and the second width W2 are substantially equal to each other" is that, for example, the difference between the first width W1 and the second width W2 is not large enough to cause large flexural deformation of a lip 13E of the rail cover 13, which is in contact with the spacer plate 14 (see, FIG. 6).

In other words, if the difference between the first width W1 and the second width W2 is large, the lip 13E inevitably experiences large flexural deformation in the areas on the spacer plate 14 where the through-holes 14A are situated.

However, if the first width W1 and the second width W2 are substantially equal to each other, the extent of the flexural deformation of the lip 13E is reduced. In the present embodiment, the difference between the first width W1 and the second width W2 is equal to or less than the maximum thickness W0 of the lip 13E.

3. Features of Seat Sliding Device

In the present embodiment, the first seat sliding device 10 comprises the spacer plate 14 that has a strip shape and is attached to the upper surface 12C of the movable rail 12, and extends in a direction parallel to the longitudinal axis of the movable rail 12 (see, FIG. 2). The spacer plate 14 comprises the through-holes 14A through which the fixing bolts 16 are disposed (see, FIG. 8).

This configuration provides a gap sized to correspond to the thickness of the spacer plate 14 between the movable rail 12 and the vehicle seat 1 (see, FIG. 6); and the rail cover 13 can be disposed in this gap. Since the rail cover 13 can cover the movable rail 12 and at least a part of the fixed rail 11, exposure of the movable rail 12 and the fixed rail 11 can be reduced.

If the aforementioned gap is provided by using, for example, a spacer that is welded to the upper surface 12C, an additional process for welding will be required, and thus the number of manufacturing processes for the movable rail 12 will be increased.

In contrast, since the spacer plate 14 according to the present embodiment comprises the through-holes 14A that allow the fixing bolts 16 to pass through, the spacer plate 14 is temporarily fixed in an oriented position with the fixing bolts 16 being disposed through the through-holes 14A.

Thus, if the movable rail 12 and the vehicle seat 1 are fixed to each other without welding the spacer plate 14 to the movable rail 12, then the spacer plate 14 is interposed and fixed between the movable rail 12 and the vehicle seat 1. In other words, the welding process of the spacer plate 14 is not required. This can prevent an increase in the number of manufacturing processes for the movable rail 12.

The spacer plate 14 comprises spacer rings 14B each having a ring shape, and the plate 14C to hold the spacer rings 14B. The spacer rings 14B can thus be used to support the weight of the vehicle seat 1 and a load imposed on the vehicle seat 1.

The spacer rings 14B are made of a different material from the plate 14C. The material for the spacer rings 14B has a higher compressive strength than the material for the plate 14C. This ensures that the spacer rings 14B can support the weight of the vehicle seat 1 and the load imposed on the vehicle seat 1.

The spacer rings 14B are preferably made of metal, and the plate 14C is preferably made of resin. This can ensure the strength of the spacer rings 14B, where a compressive strength is required, and can also prevent an increase in manufacturing cost of the spacer plate 14.

The first width W1 and the second width W2 of the spacer plate 14 are substantially equal to each other. This allows outer edges of the slit 13C, where the lips 13E contact the spacer plates 14, to have a substantially straight-line shape along the longitudinal axis of the fixed rail 11. Aging of the slit 13C such as a large partial flexural deformation on the outer edges can therefore be reduced.

(Other Embodiments)

In the aforementioned embodiment, the rail cover 13 comprises the first cover member 13A and the second cover member 13B that are disposed separately from each other with the slit 13C being disposed therebetween. Nevertheless, the rail cover 13 may comprise a single component formed by integrally combining the first cover member 13A with the second cover member 13B, with the slit 13C disposed therein, for example.

In the aforementioned embodiment, the plate 14C has a strip shape and a honeycomb structure with a number of recesses (reliefs). Nevertheless, the plate may be a simple and solid plate having a strip shape, for example.

In the aforementioned embodiment, the projections 16 are bolts. Nevertheless, the projections may be simple round or square rods, for example.

In the aforementioned embodiment, each fixing bolt 16 passes through the upper surface 12C and the side frame 9A to secure its head onto the movable rail 12 with the nut 16A being screwed down each fixing bolt 16 onto the side frame 9A. Nevertheless, the fixing bolts 16 may be disposed with their heads welded to the movable rail 12, for example.

In the aforementioned embodiment, the spacer rings 14B are made of metal, and the plate 14C is made of resin. Nevertheless, the spacer rings 14B may be made of resin that has a higher compressive strength than the resin for the plate 14C, for example.

In the aforementioned embodiment, the first width W1 and the second width W2 of the spacer plate 14 are substantially equal to each other. Nevertheless, the first width W1 and the second width W2 may be different from each other, for example.

In the aforementioned embodiment, the spacer plate 14 is not fixed to the movable rail 12 by welding. Nevertheless, the spacer plate 14 may be simply fixed to the movable rail 12 by welding, for example.

In the aforementioned embodiment, the first seat sliding device 10 is fixed to the floor panel or other part of the vehicle via the bracket 15. Nevertheless, the fixed rail 11 may be directly fixed to the floor panel or other part of the vehicle, for example.

The aforementioned embodiment describes a vehicle seat configured as a rear seat for a passenger car as an example. Nevertheless, the present disclosure may be utilized as vehicle seats for other automobiles or of railway vehicles, vessels, and aircrafts, or as built-in seats such as seats for theaters.

The present disclosure is not limited to the aforementioned embodiments as long as it falls within the spirit of the invention described in the claims. Accordingly, the present disclosure may be configured in combination of at least two of the aforementioned embodiments.

What is claimed is:

1. A seat sliding device that supports a seat so that the seat is slidable, the device comprising:
    a fixed rail;
    a movable rail that is slidable relative to the fixed rail and configured to support the seat;
    a first projection that protrudes towards the seat from an upper surface of the movable rail that faces the seat and is configured to fix the seat to the movable rail;
    a rail cover that is elastic and configured to cover the upper surface, extends in a direction parallel to a longitudinal axis of the fixed rail, and comprises a slit that allows the projection to pass through; and
    a spacer plate that has a strip shape and is attached to the upper surface, extends in a direction parallel to a longitudinal axis of the movable rail, and comprises a first through-hole for the first projection to pass through.

2. The seat sliding device according to claim 1, wherein the spacer plate comprises:
    a first spacer ring that has a ring shape and configures a peripheral part of the first through-hole, and
    a plate body that has a strip shape and holds the first spacer ring.

3. The seat sliding device according to claim 2, wherein the first spacer ring and the plate body are each made of a different material, and
    wherein a material for the first spacer ring has a higher compressive strength than a material for the plate body.

4. The seat sliding device according to claim 3, wherein the first spacer ring is made of metal, and the plate body is made of resin.

5. The seat sliding device according to claim 1, wherein a width measurement is one of outer dimensions of an area of the spacer plate taken along a line parallel to a seat-width axis;
    wherein a first width (W1) is a first width measurement of an area of the spacer plate where the first through-hole is situated;
    wherein a second width (W2) is a second width measurement of an area of the spacer plate where no through-hole is situated; and
    wherein the first width and the second width are substantially equal to each other.

6. The seat sliding device according to claim 5,
    wherein the rail cover includes a lip having a maximum lip width (W0),
    wherein W1>W2, and
    wherein (W1−W2)≤W0.

7. The seat sliding device according to claim 2, further comprising:
    a second projection protruding upwardly from the upper surface of the movable rail; and
    a third projection protruding upwardly from the upper surface of the movable rail,
    wherein the spacer plate further includes:
        a second spacer ring defining a second through-hole, and wherein the second through-hole is sized to pass the second projection, and
        a third spacer ring defining a third through-hole, wherein the third through-hole is sized to pass the third projection.

8. The seat sliding device according to claim 7,
wherein the first projection is located in a front half of the movable rail, and
wherein the second and third projections are located in a rear half of the movable rail.

9. The seat sliding device according to claim 8,
wherein the spacer plate further includes:
   a metal cylinder with a cylindrical shape, a vertical axis, and configured to transfer a downward force from a cushion frame to the upper surface of the movable rail, and
wherein the metal cylinder is located in the front half of the spacer plate, and is located rearward of the first through hole.

10. The seat sliding device according to claim 7,
wherein a width measurement is one of outer dimensions of an area of the spacer plate taken along a line parallel to a seat-width axis;
wherein a first width (W1) is a first width measurement of an area of the spacer plate where the first through-hole is situated;
wherein a second width (W2) is a second width measurement of an area of the spacer plate where no through-hole is situated;
wherein the rail cover includes a lip having a maximum lip width (W0),
wherein W1>W2, and
wherein (W1−W2)≤W0.

11. The seat sliding device according to claim 1,
wherein the rail cover includes:
   a first cover member adhered to a first upper surface of the fixed rail and to a first side surface of the fixed rail, and
   a second cover member adhered to a second upper surface of the fixed rail and to a second side surface of the fixed rail.

* * * * *